(12) United States Patent
Kanakasabai et al.

(10) Patent No.: US 11,018,533 B2
(45) Date of Patent: May 25, 2021

(54) CALIBRATION DEVICE AND METHOD FOR DETERMINING AN OPTIMAL OPERATING FREQUENCY OF A POWER TRANSFER SYSTEM

(71) Applicant: GENERAL ELECTRIC COMPANY, Schenectady, NY (US)

(72) Inventors: Viswanathan Kanakasabai, Karnataka (IN); Arun Kumar Raghunathan, Karnataka (IN); Satishbabu Bhogineni, Chennai (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/469,531

(22) PCT Filed: Oct. 30, 2017

(86) PCT No.: PCT/US2017/058983
§ 371 (c)(1),
(2) Date: Jun. 13, 2019

(87) PCT Pub. No.: WO2018/111424
PCT Pub. Date: Jun. 21, 2018

(65) Prior Publication Data
US 2020/0099256 A1    Mar. 26, 2020

(30) Foreign Application Priority Data
Dec. 16, 2016  (IN) .............................. 201641043105

(51) Int. Cl.
*H02J 50/90*  (2016.01)
*H02J 50/12*  (2016.01)
(Continued)

(52) U.S. Cl.
CPC ............ *H02J 50/90* (2016.02); *B60L 53/122* (2019.02); *H02J 5/005* (2013.01); *H02J 7/025* (2013.01); *H02J 50/12* (2016.02)

(58) Field of Classification Search
CPC . H02J 50/90; H02J 50/12; H02J 5/005; B60L 53/122
See application file for complete search history.

(56) References Cited

U.S. PATENT DOCUMENTS 7,554,316 B2 * 6/2009 Stevens ................... H02J 7/025
                                                              323/355
7,605,496 B2 * 10/2009 Stevens ................... H02J 50/80
                                                              307/17

(Continued)

FOREIGN PATENT DOCUMENTS

WO      2018111424     6/2018

OTHER PUBLICATIONS

"PCT Application No. PCT/US2017/058983 International Preliminary Report on Patentability", dated Jun. 27, 2019, 11 pages.
(Continued)

Primary Examiner — Thomas J. Hiltunen
(74) Attorney, Agent, or Firm — DeLizio Law, PLLC

(57) ABSTRACT

A calibration device includes a controller configured to communicate a plurality of input voltage signals having different determined frequencies to a first power exchange coil. Also, the calibration device includes a load unit coupled to a second power exchange coil, where the load unit includes at least a first electrical load and a second electrical load. Further, the calibration device includes a voltage sensor configured to measure a plurality of first output voltage signals across the first electrical load and a plurality of second output voltage signals across the second electrical load, and where the controller is configured to determine an optimal operating frequency of a wireless power transfer (Continued)

system based on the plurality of input voltage signals, the plurality of first output voltage signals, and the plurality of second output voltage signals.

20 Claims, 4 Drawing Sheets

(51) Int. Cl.
*H02J 5/00* (2016.01)
*H02J 7/02* (2016.01)
*B60L 53/122* (2019.01)

(56) References Cited

U.S. PATENT DOCUMENTS

| | | | | |
|---|---|---|---|---|
| 9,112,367 | B2* | 8/2015 | Kim | H04B 5/0081 |
| 9,231,413 | B2* | 1/2016 | Ueno | H02J 7/025 |
| 9,509,374 | B2* | 11/2016 | Kim | H04B 5/0081 |
| 10,305,333 | B2* | 5/2019 | Shimokawa | H02J 50/40 |
| 2013/0020862 | A1 | 1/2013 | Miller | |
| 2014/0184150 | A1 | 7/2014 | Walley | |
| 2014/0217973 | A1 | 8/2014 | Lee et al. | |
| 2015/0251545 | A1* | 9/2015 | Matsukura | H02J 50/90 320/108 |
| 2015/0255991 | A1* | 9/2015 | Tsunekawa | H02J 50/80 307/104 |
| 2015/0270841 | A1 | 9/2015 | Liu | |
| 2015/0357991 | A1* | 12/2015 | Ono | H01F 38/14 320/108 |
| 2016/0181824 | A1 | 6/2016 | Hui et al. | |

OTHER PUBLICATIONS

"PCT Application No. PCT/US2017/058983 International Search Report and Written Opinion", dated Feb. 27, 2018, 12 pages.
"India Application No. 201641043105 Examination Report", dated Apr. 24, 2019, 7 pages.

* cited by examiner

CALIBRATION DEVICE AND METHOD FOR DETERMINING AN OPTIMAL OPERATING FREQUENCY OF A POWER TRANSFER SYSTEM

BACKGROUND

Embodiments of the present specification relate generally to wireless power transfer systems, and more particularly to a calibration device and method for determining an optimal operating frequency of a wireless power transfer system.

In general, power transfer systems are widely used to transfer power from a power source to one or more electrical loads, such as batteries in a hybrid or electric vehicle. Typically, the power transfer systems include contact-based power transfer systems or contactless power transfer systems. In the contact based power transfer systems, components such as plugs, socket connectors, and wires are physically coupled to the batteries for charging the batteries. However, due to environmental impact, such connectors and wires may be damaged or corroded. Also, high values of currents and voltages are used for charging the batteries. Hence, establishing a physical connection between the power source and the batteries in the vehicle may involve cumbersome safety measures. Also, this type of contact-based power transfer system tends to be bulkier and heavier compared to the contactless power transfer system.

Further, in the contactless power transfer systems, power converters are used to convert an input power to a transferrable power, which is then transmitted to the electrical load, such as the batteries in the vehicle. The power converter includes switches which are operated at a particular operating frequency to convert the input power to the transferrable power. Typically, depending upon the load, the operating frequency of the power converter is changed to regulate or control an output voltage of the power transfer system. However, if the electrical load is disconnected or varied, the output voltage of the power transfer system may attain a very high value in a very short time period. Consequently, a voltage gain of the power transfer system may vary drastically. Such a sudden increase in the output voltage and/or drastic variations in the voltage gain may lead to failure of operation of the power transfer system and/or result in damage to one or more components in the power transfer system.

BRIEF DESCRIPTION

Briefly in accordance with one aspect of the present specification, a calibration device for determining an optimal operating frequency of a wireless power transfer system is presented. The wireless power transfer system includes a first power exchange coil and a second power exchange coil. Further, the calibration device includes a controller operatively coupled to the first power exchange coil of the wireless power transfer system, where the controller is configured to communicate a plurality of input voltage signals having different determined frequencies to the first power exchange coil. Also, the calibration device includes a load unit operatively coupled to the second power exchange coil of the wireless power transfer system, where the load unit includes at least a first electrical load and a second electrical load, and where at a particular instance of time, only one of the first electrical load and the second electrical load is coupled to the second power exchange coil. Further, the calibration device includes a voltage sensor coupled to the load unit, where the voltage sensor is configured to measure a plurality of first output voltage signals across the first electrical load and a plurality of second output voltage signals across the second electrical load, and where the plurality of first output voltage signals and the plurality of second output voltage signals are measured in response to the plurality of input voltage signals, and where the controller is configured to determine the optimal operating frequency of the wireless power transfer system based on the plurality of input voltage signals, the plurality of first output voltage signals, and the plurality of second output voltage signals.

In accordance with another aspect of the present specification, a method for determining an optimal operating frequency of a wireless power transfer system including a calibration device having a controller, a load unit, and a voltage sensor, is presented. The method includes transmitting, by the controller, a plurality of input voltage signals having different determined frequencies to a first power exchange coil of the wireless power transfer system. Also, the method includes measuring, by the voltage sensor, a plurality of first output voltage signals across a first electrical load of the load unit and a plurality of second output voltage signals across a second electrical load of the load unit, and where the plurality of first output voltage signals and the plurality of second output voltage signals are generated in response to the plurality of input voltage signals. Further, the method includes determining, by the controller, the optimal operating frequency of the wireless power transfer system based on the plurality of input voltage signals, the plurality of first output voltage signals, and the plurality of second output voltage signals. In addition, the method includes operating the wireless power transfer system at the optimal operating frequency to minimize variation of a voltage gain in the wireless power transfer system.

In accordance with yet another aspect of the present specification, a wireless power transfer system is presented. The wireless power transfer system includes a contactless power transfer unit including at least a first power exchange coil and a second power exchange coil magnetically coupled to each other. Also, the wireless power transfer system includes a calibration device operatively coupled to the contactless power transfer unit, where the calibration device includes a controller operatively coupled to the first power exchange coil of the contactless power transfer unit, and where the controller is configured to communicate a plurality of input voltage signals having different determined frequencies to the first power exchange coil. Further, the calibration device includes a load unit operatively coupled to the second power exchange coil of the contactless power transfer unit, where the load unit includes at least a first electrical load and a second electrical load, and wherein at a particular instance of time, only one of the first electrical load and the second electrical load is coupled to the second power exchange coil. Also, the calibration device includes a voltage sensor operatively coupled to the load unit, where the voltage sensor is configured to measure a plurality of first output voltage signals across the first electrical load and a plurality of second output voltage signals across the second electrical load, where the plurality of first output voltage signals and the plurality of second output voltage signals are generated in response to the plurality of input voltage signals, and where the controller is configured to determine the optimal operating frequency of the wireless power transfer system based on the plurality of input voltage signals, the plurality of first output voltage signals, and the plurality of second output voltage signals.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

As will be described in detail hereinafter, various embodiments of a system and method for determining an optimal operating frequency of a wireless power transfer system are disclosed. In particular, a calibration device that is configured to determine the optimal operating frequency of the wireless power transfer system is presented. By operating the wireless power transfer system at this optimal operating frequency, an output voltage of the wireless power transfer system is controlled or maintained within a desired threshold value independent of variations in a device load coupled to the wireless power transfer system and/or impedance in the wireless power transfer system.

Figure 1:
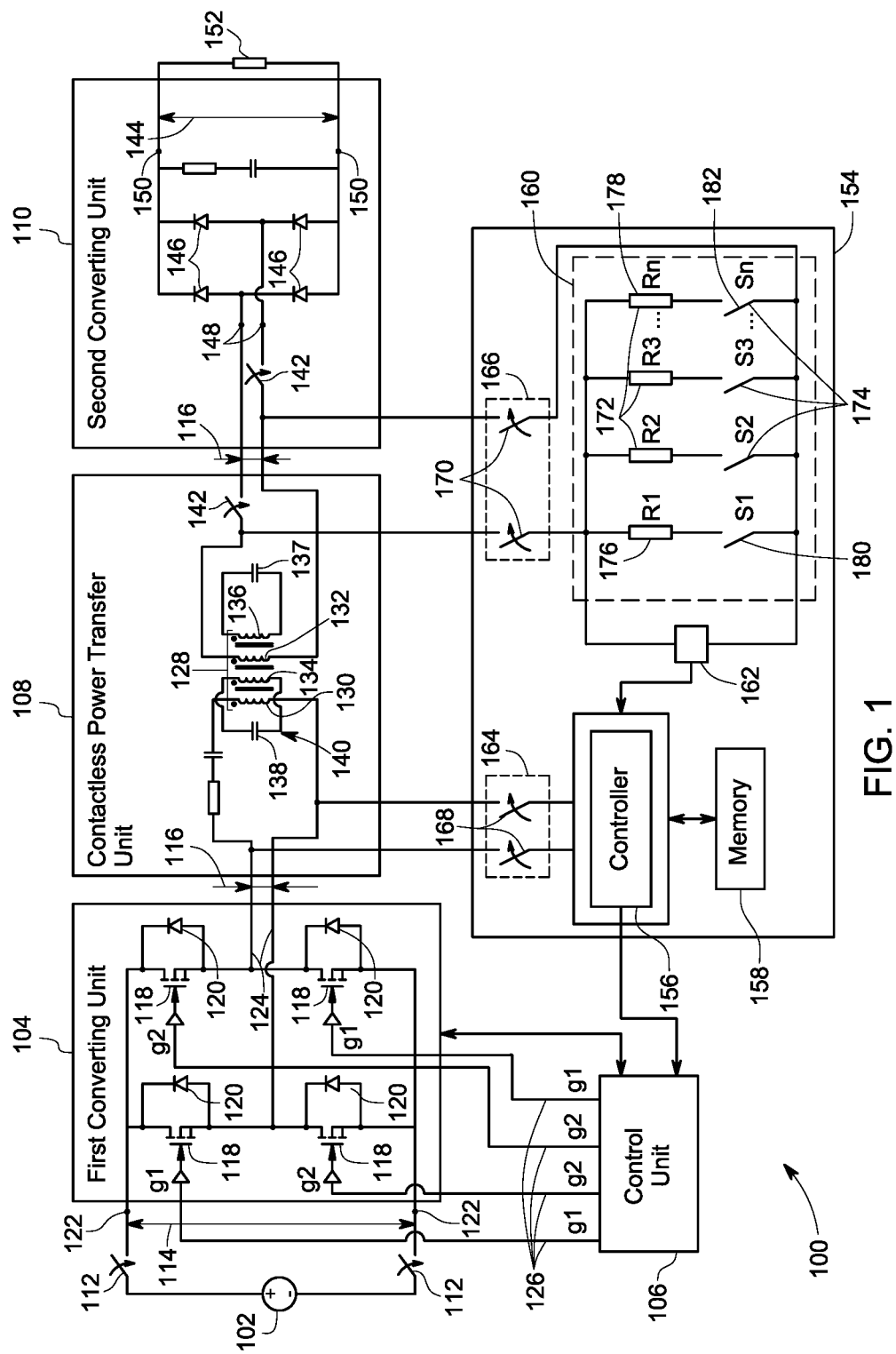
FIG. 1 is a diagrammatical representation of a wireless power transfer system 100, in accordance with aspects of the present specification.

FIG. 1 is a diagrammatical representation of a wireless power transfer system 100, in accordance with aspects of the present specification. The wireless power transfer system 100 is used to transmit electrical power from a power source 102 to one or more device loads 152 such as batteries, mobile devices such as cell phones, laptops, heating, ventilation, air conditioning (HVAC) systems, and the like. In one example, in the automobile industry, an electric vehicle or a hybrid vehicle includes one or more batteries that supply electrical power to drive the vehicle. Such batteries may be electrically charged from the power source 102 via the wireless power transfer system 100. It may be noted that the term "device load" and "battery" may be used interchangeably in the following description. Further, if the device load 152 is fully charged, then a load state of the device load 152 is referred as a "no load" state. Similarly, if the device load 152 has a minimal charge or no charge, then the load state of the device load is referred as a "full load" state. In one embodiment, the wireless power transfer system 100 may also be referred to as a contactless power transfer system.

In the illustrated embodiment of FIG. 1, the wireless power transfer system 100 includes a first converting unit 104, a control unit 106, a contactless power transfer unit 108, and a second converting unit 110. The first converting unit 104 may be representative of an inverter, while the second converting unit 110 is representative of a rectifier. Further, the first converting unit 104 is electrically coupled to or decoupled from the power source 102 via first power switches 112. Particularly, in a normal operation, the first power switches 112 are activated to couple the power source 102 to the first converting unit 104. Also, the first converting unit 104 is electrically coupled to the control unit 106. Further, the power source 102 is configured to supply an input power having a first DC voltage 114 to the first converting unit 104. In some embodiments, the input power may be in a range from about 100 W to about 6.6 kW. Also, in one embodiment, the power source 102 may be a part of the wireless power transfer system 100. However, in another embodiment, the power source 102 may be positioned external to the wireless power transfer system 100.

The first converting unit 104 is configured to receive the input power having the first DC voltage 114 from the power source 102. Further, the first converting unit 104 is configured to convert the first DC voltage 114 of the input power to an AC voltage 116. In one embodiment, the first converting unit 104 includes a plurality of switches 118 and diodes 120 that are electrically coupled between input terminals 122 and output terminals 124 of the first converting unit 104. Also, these switches 118 and diodes 120 are arranged to form an inverter circuit, as shown in FIG. 1. In one embodiment, the switches 118 may include electronic switches, such as MOSFETs or IGBTs.

It may be noted that the wireless power transfer system 100 is operated at a determined operating frequency. Further, the control unit 106 may generate gate signals $g_1$ and $g_2$ 126 having the determined operating frequency of the wireless power transfer system 100. In one embodiment, the determined operating frequency may be representative of a frequency of switching pulses in the gate signals 126 that are used to activate and deactivate the switches 118 in the wireless power transfer system 100, particularly, in the first converting unit 104. In particular, the gate signals $g_1$ and $g_2$ 126 may be supplied to the switches 118 to activate and deactivate the switches 118.

In one example, the determined operating frequency may be a frequency of operating the first converting unit 104 to convert the DC voltage to a corresponding AC voltage. It may be noted that the terms "determined operating frequency" and "operating frequency" may be used interchangeably. In one example, the control unit 106 may determine the operating frequency of the wireless power transfer system 100 based on the device load 152 coupled to the wireless power transfer system 100. In one embodiment, the control unit 106 may include a digital circuit and/or a processor that perform one or more functions based on pre-stored instructions or programs to generate the gate signals 126 having the determined operating frequency.

Also, the control unit 106 may transmit the gate signals 126 having the determined operating frequency to the switches 118 of the first converting unit 104 to facilitate conversion of the first DC voltage 114 of the input power to the AC voltage 116. More specifically, the switches 118 are activated or deactivated based on the determined operating frequency to allow the first converter unit 104 to convert the first DC voltage 114 to the AC voltage 116. Upon converting the first DC voltage 114 to the AC voltage 116, the first converting unit 104 is further configured to transmit the input power having the AC voltage 116 to the contactless power transfer unit 108.

The contactless power transfer unit 108 includes two or more coils or an array of coils 128 that are magnetically coupled to each other. These coils 128 are used for wirelessly transmitting the input power having the AC voltage 116 from the first converting unit 104 to the second converting unit 110. Particularly, the array of coils 128 includes a first power exchange coil 130 and a second power exchange coil 132. The first power exchange coil 130 is electrically coupled to the first converting unit 104, while the second power exchange coil 132 is electrically coupled to the second converting unit 110. Also, the first power exchange coil 130 and the second power exchange coil 132 are magnetically coupled to each other.

In another embodiment, in addition to the first power exchange coil 130 and the second power exchange coil 132, the arrays of coils 128 may include a resonant coil 134 and a compensation coil 136. The resonant coil 134 is positioned between the first power exchange coil 130 and the second power exchange coil 132 and is magnetically coupled to the first and second power exchange coils 130, 132. In one embodiment, the resonant coil 134 may be coupled to a capacitor 138 to form a resonant circuit 140 in the contactless power transfer unit 108. Also, in one example, the resonant circuit 140 may be operated at a resonant frequency that is proximate to the operating frequency of the wireless power transfer system 100 to enhance the transmission of the input power to the second converting unit 110. The resonant frequency may be representative of a frequency at which the resonant coil 134 and the capacitor 138 resonate to enhance the transmission of the input power to the second power exchange coil 132. Further, the compensation coil 136 is magnetically coupled to the second power exchange coil 132. The compensation coil 136 and a capacitor 137 are used to match an impedance of the contactless power transfer unit 108 with an impedance of the second converting unit 110.

Moreover, the input power having the AC voltage 116 is used to excite the first power exchange coil 130. A primary current corresponding to the AC voltage 116 flows through the first power exchange coil 130 resulting in excitation of the first power exchange coil 130. The excitation of the first power exchange coil 130 in turn generates a magnetic field that excites the resonant coil 134. Further, the magnetic field generated by the first power exchange coil 130 is transferred to the second power exchange coil 132 via the excited resonant coil 134. More specifically, the excited resonant coil 134 may also generate a corresponding magnetic field, which in turn enhances the magnetic field generated by the first power exchange coil 130. The enhanced magnetic field is conveyed to the second power exchange coil 132.

As the second power exchange coil 132 is magnetically or wirelessly coupled to the first power exchange coil 130, the second power exchange coil 132 receives the magnetic field from the first power exchange coil 130 and converts the magnetic field back to the input power having the AC voltage 116. Particularly, when the magnetic field passes through turns of the second power exchange coil 132, a voltage is induced into the second power exchange coil 132. This induced voltage is similar to the AC voltage 116. Further, the input power having the AC voltage 116 is then transmitted from the second power exchange coil 132 to the second converting unit 110. Thus, the input power is wirelessly transferred from the first power exchange coil 130 to the second power exchange coil 132.

In one embodiment, the second converting unit 110 is electrically coupled to the contactless power transfer unit 108 via second power switches 142. During normal operation of the wireless power transfer system 100, the second power switches 142 are activated to couple the second power exchange coil 132 to the second converting unit 110. Upon receiving the power having the AC voltage 116 from the contactless power transfer unit 108, the second converting unit 110 is configured to convert the AC voltage 116 of the input power to a second DC voltage 144. Particularly, the second converting unit 110 includes a plurality of diodes 146 that is electrically coupled between input terminals 148 and output terminals 150 of the second converting unit 110. These diodes 146 may be arranged to form a bridge rectifier. In this configuration, the diodes 146 are configured to convert the AC voltage 116 to the second DC voltage 144. In some embodiments, the diodes 146 may be replaced by electronic switches, such as MOSFETs and IGBTs. Also, in one embodiment, the input power having the second DC voltage 144 may be used for charging the device load 152, such as one or more batteries in the electric or hybrid vehicle.

In conventional systems, a wireless communication path is used to communicate an output voltage from a device load to a control unit to regulate the output voltage. In one example, the wireless communication path is provided via use of a sensor and transceivers. Particularly, the sensor is coupled to the device load and configured to sense the output voltage across the device load. Further, the sensor transmits a signal representative of the output voltage to the control unit via the transceivers. The control unit is configured to adjust an operating frequency of the system based on the received signal to control or regulate the output voltage across the device load. However, communicating the signal using the wireless communication path may result in a delay in the receipt of the signal by the control unit. The delay may be in a range from about 1 ms to about 10 ms. In such a scenario, the control unit may not be equipped to control the output voltage across the device load in a timely manner due to the delay in communicating the signal to the control unit. This lack of timely control may result in an increase of the output voltage above a threshold or allowable value, which in turn may adversely impact the components in the system. In one example, the threshold value may be about 80% of a maximum allowable voltage rating of the components in the system.

The exemplary wireless power transfer system 100 aids in circumventing the issues related to the increase of the output voltage beyond the threshold value. In particular, the wireless power transfer system 100 includes a calibration device 154 that is used to "calibrate" the wireless power transfer system 100 prior to the normal operation of the wireless power transfer system 100. The phrase "calibrate the wireless power transfer system" or "calibration of the wireless power transfer system" is used to refer to a process that is employed to determine an optimal operating frequency of the first converting unit 104 of the wireless power transfer system 100. The optimal operating frequency may be representative of a frequency of operating the first converting unit 104 such that variation of a voltage gain in the wireless power transfer system 100 is minimized. In one embodiment, the optimal operating frequency may be a single frequency value and in other embodiments, it may include a range of values. In one example, the optimal operating frequency may be in a range from about 80 kHz to 100 kHz. It may be noted that the voltage gain is a ratio of the second DC voltage 144 to the first DC voltage 114. Also, the terms "second DC voltage" and "output voltage" may be used interchangeably.

In one example, the wireless power system 100 may be configured to maintain the voltage gain within a determined gain range. Operating the first converting unit 104 at the optimal operating frequency advantageously aids the wireless power transfer system 100 in controlling the second DC voltage 144 to a value that is proximate or equal to the first DC voltage 114 independent of any changes in the device load 152. Implementing the wireless power transfer system 100 as described hereinabove allows the second DC voltage 144 to be maintained within the threshold value and the voltage gain to be maintained within the determined gain range, thereby reducing stress on the components of the wireless power transfer system 100.

As depicted in FIG. 1, in a presently contemplated configuration, the calibration device 154 includes a controller 156, a memory 158, a load unit 160, a voltage sensor 162, a first switching sub-unit 164, and a second switching sub-unit 166. The first switching sub-unit 164 is used to couple the controller 156 to the contactless power transfer unit 108 or decouple the controller 156 from the contactless power transfer unit 108. In particular, the first switching sub-unit 164 includes electronic or mechanical switches 168 that are used to electrically couple the controller 156 to the first power exchange coil 130 of the contactless power transfer unit 108.

The controller 156 may be configured to generate and convey a plurality of input voltage signals having different determined frequencies to the first power exchange coil 130. In one embodiment, these input voltage signals have a lower power in comparison to the input power having the first DC voltage 114 supplied by the power source 102. Additionally, in one example, the input voltage signals may have a voltage value in a range from about 1 V to about 20 V, while a value of the first DC voltage 114 may be in a range from about 20 V to about 150 V. Also, the determined frequencies of the input voltage signals may have a frequency within a frequency band. In one example, the frequency band may include frequencies in a range from about 80 kHz to about 100 kHz.

Furthermore, in one example, the input voltage signals may include a first input voltage signal $V_{i1}$ having a first frequency $f_1$, a second input voltage signal $V_{i2}$ having a second frequency $f_2$, a third voltage signal $V_{i3}$ having a third frequency $f_3$, and a fourth voltage signal $V_{i4}$ having a fourth frequency $f_4$. It may be noted that the first, second, third, and fourth input voltage signals $V_{i1}$, $V_{i2}$, $V_{i3}$, $V_{i4}$ may have the same values of voltage or substantially similar values of voltage. However, each of these input voltage signals $V_{i1}$, $V_{i2}$, $V_{i3}$, $V_{i4}$ may have different frequency values. For example, the first frequency $f_1$ may have a value of around 80 kHz, while a value of the second frequency $f_2$ may be around 81 kHz. In a similar fashion, a value of the third frequency $f_3$ may be around 83 kHz, while the fourth frequency $f_4$ has a value of around 84 kHz. Also, in one example, these frequency values may be incremented by 1 kHz, 5 kHz, or 10 kHz within the particular frequency band. It may be noted that for ease of understanding, only four input voltage signals $V_{i1}$, $V_{i2}$, $V_{i3}$, $V_{i4}$ are considered in the present specification. However, use of any number of input voltage signals with different frequencies that sweep across the particular frequency band is envisioned.

In a similar manner, the second switching sub-unit 166 is used to couple the load unit 160 to the contactless power transfer unit 108 or decouple the load unit 160 from the contactless power transfer unit 108. In particular, the second switching sub-unit 166 includes electronic or mechanical switches 170 that are used to electrically couple the load unit 160 to the second power exchange coil 132. Further, during the calibration of the wireless power transfer system 100, these switches 170 are activated to couple the load unit 160 to the second power change coil 132. Also, when the switches 170 in the second switching sub-unit 166 are activated, the power switches 142 are deactivated to decouple the second converting unit 110 from the second power exchange coil 132.

Furthermore, the load unit 160 includes a plurality of electrical loads $R_1$, $R_2$, $R_3$, ..., $R_n$ 172 and a plurality of switches $S_1$, $S_2$, $S_3$, ..., $S_n$ 174. These electrical loads 172 may be selected such that the electrical loads 174 are equivalent to the device load 152 at different load states, such as the "no load" state and the "full load" state. For ease of understanding, only two electrical loads, such as a first electrical load $R_1$ 176 and a second electrical load $R_n$ 178 are considered from the electrical loads 172 in the load unit 160. The first electrical load 176 may be equivalent to the device load 152 at the "no load" state, while the second electrical load 178 may be equivalent to the device load 152 at the "full load" state.

As depicted in FIG. 1, the first electrical load $R_1$ 176 is coupled in series with a first switch $S_1$ 180, while the second electrical load $R_n$ 178 is coupled in series with a second switch $S_n$ 182. Also, the first electrical load 176 may be coupled to the second power exchange coil 132 if the first switch 180 and the second switching sub-unit 166 are activated or closed. Similarly, the second electrical load 178 may be coupled to the second power exchange coil 132 if the second switch 182 and the second switching sub-unit 166 are activated or closed. It may be noted that the calibration device 154 is implemented such that at any given time, only one of the electrical loads 176, 178 is coupled to the second power exchange coil 132. By way of example, the first electrical load 176 is coupled to the second power exchange coil 132 when the second electrical load 178 is decoupled from the second power exchange coil 132. Similarly, the second electrical load 178 is coupled to the second power exchange coil 132 when the first electrical load 176 is decoupled from the second power exchange coil 132.

Furthermore, the voltage sensor 162 is coupled to the first electrical load 176 and the second electrical load 178. If the first electrical load 176 is coupled to the second power exchange coil 132, the voltage sensor 162 is configured to measure a first output voltage signal across the first electrical load 176, where the first output voltage signal is representative of a voltage across the first electrical load 176. Similarly, if the second electrical load 178 is coupled to the second power exchange coil 132, the voltage sensor 162 is configured to measure a second output voltage signal across the second electrical load 178, where the second output voltage signal is representative of a voltage across the second electrical load 178. Further, the voltage sensor 162 may be communicatively coupled to the controller 156 and configured to communicate the first and second output voltage signals to the controller 156.

Moreover, in certain embodiments, the calibration device 154 may be configured such that a first portion of the calibration device 154 is positioned at a receiver side such as in a vehicle and a second portion of the calibration device 154 is positioned at a transmitter side such as in the power source 102. By way of example, the first portion of the calibration device 154 that includes the load unit 160 and the voltage sensor 162 may be positioned in the vehicle, while the second portion of the calibration device 154 that includes the controller 156 and the memory 158 may be positioned in the power source 102. Further, the voltage sensor 162 may be wirelessly coupled to the controller 156 to transmit the first and second output voltage signals to the controller 156.

During the calibration of the wireless power transfer system 100, the first power switches 112 are deactivated or opened to decouple the power source 102 from the wireless power transfer system 100. Also, the second power switches 142 are deactivated to decouple the second converting unit 110 and the device load 152 from the contactless power transfer unit 108. Further, the first switching sub-unit 164 and the second switching sub-unit 166 are activated to couple the calibration device 154 to the contactless power transfer unit 108. Particularly, the controller 156 is coupled to the first power exchange coil 130, while the load unit 160 is coupled to the second power exchange coil 132. Also, initially, the first switch 180 is activated and the second switch 182 is deactivated to couple only the first electrical load 176 to the second power exchange coil 132.

Furthermore, the controller 156 may generate and convey the plurality of input voltage signals $V_{i1}$, $V_{i2}$, $V_{i3}$, $V_{i4}$ to the first power exchange coil 130 in a serial manner. As previously noted, the input voltage signals $V_{i1}$, $V_{i2}$, $V_{i3}$, $V_{i4}$ have different determined frequencies $f_1$, $f_2$, $f_3$, $f_4$. Moreover, the magnetic coupling between the first power exchange coil 130 and the second power exchange coil 132 may be used to convey these input voltage signals $V_{i1}$, $V_{i2}$, $V_{i3}$, $V_{i4}$ from the first power exchange coil 130 to the second power exchange coil 132. Subsequent to the receipt of the input voltage signals $V_{i1}$, $V_{i2}$, $V_{i3}$, $V_{i4}$, the second power exchange coil 132 may be configured to convey the input voltage signals $V_{i1}$, $V_{i2}$, $V_{i3}$, $V_{i4}$ to the first electrical load 176 via the activated switch 170 in the second switching sub-unit 166.

The voltage sensor 162 is also configured to measure a plurality of first output voltage signals $V_{1o1}$, $V_{1o2}$, $V_{1o3}$, $V_{1o4}$ having different determined frequencies $f_1$, $f_2$, $f_3$, $f_4$ across the first electrical load 176. It may be noted that these first output voltage signals $V_{1o1}$, $V_{1o2}$, $V_{1o3}$, $V_{1o4}$ are measured when the input voltage signals $V_{i1}$, $V_{i2}$, $V_{i3}$, $V_{i4}$ are received by the first electrical load 176. By way of example, if the first input voltage signal $V_{i1}$ is received by the first electrical load 176, a corresponding first output voltage signal $V_{1o1}$ is measured by the voltage sensor 162. In a similar fashion, if the first input voltage signal $V_{i2}$ is received by the first electrical load 176, a corresponding first output voltage signal $V_{1o2}$ is measured by the voltage sensor 162.

Moreover, frequencies associated with the output voltage signals $V_{1o1}$, $V_{1o2}$, $V_{1o3}$, $V_{1o4}$, are the same as or are substantially similar to the frequencies associated with corresponding input voltage signals $V_{i1}$, $V_{i2}$, $V_{i3}$, $V_{i4}$. For example, if the input voltage signal $V_{i1}$ having the first frequency $f_1$ is transmitted to the first power exchange coil 130, then the corresponding output voltage signal $V_{1o1}$ that is measured by the voltage sensor 162 across the first electrical load 176 also has a frequency of $f_1$. Similarly, if the second input voltage signal $V_{i2}$ having the second frequency $f_2$ is transmitted to the first power exchange coil 130, then the corresponding output voltage signal $V_{1o2}$ that is measured by the voltage sensor 162 across the first electrical load 176 also has a frequency of $f_2$.

Upon measuring the first output voltage signals $V_{1o1}$, $V_{1o2}$, $V_{1o3}$, $V_{1o4}$ across the first electrical load 176, the voltage sensor 162 communicates these first output voltage signals $V_{1o1}$, $V_{1o2}$, $V_{1o3}$, $V_{1o4}$ to the controller 156. Further, the controller 156 may compute a plurality of first voltage gains $V_{1g1}$, $V_{1g2}$, $V_{1g3}$, $V_{1g4}$ based on the input voltage signals $V_{i1}$, $V_{i2}$, $V_{i3}$, $V_{i4}$ and the corresponding first output voltage signals $V_{1o1}$, $V_{1o2}$, $V_{1o3}$, $V_{1o4}$. By way of example, the controller 156 may compute a voltage gain $V_{1g1}$ based on a ratio of the first load voltage signal $V_{1o1}$ and the first input voltage signal $V_{i1}$. Similarly, the controller 156 may compute a voltage gain $V_{1g2}$ based on a ratio of the second load voltage signal $V_{1o2}$ and the second input voltage signal $V_{i2}$. It may be noted that each of the first voltage gains $V_{1g1}$, $V_{1g2}$, $V_{1g3}$, $V_{1g3}$ corresponds to one of the different determined frequencies of the input voltage signals. In one example, the voltage gain $V_{1g1}$ corresponds to the first frequency $f_1$, while the voltage gain $V_{1g2}$ corresponds to the second frequency $f_2$. Further, the controller 156 may store the first voltage gains $V_{1g1}$, $V_{1g2}$, $V_{1g3}$, $V_{1g4}$ and their corresponding frequencies $f_1$, $f_2$, $f_3$, $f_4$ in the memory 158 of the calibration device 154.

In a similar manner, the second electrical load 178 is coupled to the second power exchange coil 132, while the first electrical load 176 is decoupled from the second power exchange coil 132. Further, the controller 156 may generate and convey the plurality of input voltage signals $V_{i1}$, $V_{i2}$, $V_{i3}$, $V_{i4}$ having different determined frequencies $f_1$, $f_2$, $f_3$, $f_4$ to the first power exchange coil 130. As the first power exchange coil 130 is magnetically coupled to the second power exchange coil 132, the first power exchange coil 130 conveys these input voltage signals $V_{i1}$, $V_{i2}$, $V_{i3}$, $V_{i4}$ to the second power exchange coil 132. Subsequent to the receipt of the input voltage signals $V_{i1}$, $V_{i2}$, $V_{i3}$, $V_{i4}$, the second power exchange coil 132 may be configured to convey the input voltage signals $V_{i1}$, $V_{i2}$, $V_{i3}$, $V_{i4}$ to the second electrical load 178 via the activated switch 170 in the second switching sub-unit 166. Also, the voltage sensor 162 is configured to measure a plurality of second output voltage signals $V_{2o1}$, $V_{2o2}$, $V_{2o3}$, $V_{2o4}$ having different determined frequencies $f_1$, $f_2$, $f_3$, $f_4$ across the second electrical load 178. Further, the voltage sensor 162 may communicate the second output voltage signals $V_{2o1}$, $V_{2o2}$, $V_{2o3}$, $V_{2o4}$ to the controller 156.

Additionally, the controller 156 may compute a plurality of second voltage gains $V_{2g1}$, $V_{2g2}$, $V_{2g3}$, $V_{2g4}$ based on the input voltage signals $V_{i1}$, $V_{i2}$, $V_{i3}$, $V_{i4}$ and the corresponding second output voltage signals $V_{2o1}$, $V_{2o2}$, $V_{2o3}$, $V_{2o4}$. By way of example, the controller 156 may compute a voltage gain $V_{2g1}$ based on the ratio of a first load voltage signal $V_{2o1}$ and the first input voltage signal $V_{i1}$. Similarly, the controller 156 may compute a voltage gain $V_{2g2}$ based on the ratio of the second load voltage signal $V_{2o2}$ and the second input voltage signal $V_{i2}$. Further, the controller 156 may store the second voltage gains $V_{2g1}$, $V_{2g2}$, $V_{2g3}$, $V_{2g4}$ and their corresponding frequencies $f_1$, $f_2$, $f_3$, $f_4$ in the memory 158 of the calibration device 154.

Moreover, the controller 156 may compare the first voltage gains $V_{1g1}$, $V_{1g2}$, $V_{1g3}$, $V_{1g4}$ with the second voltage gains $V_{2g1}$, $V_{2g2}$, $V_{2g3}$, $V_{2g4}$. For example, a voltage gain value of the first voltage gain $V_{1g1}$ is compared with a voltage gain value of a corresponding second voltage gain $V_{2g1}$. Similarly, a voltage gain value of the first voltage gain $V_{1g2}$ is compared with a voltage gain value of a corresponding second voltage gain $V_{2g2}$. Further, the controller 156 may identify a determined frequency from the different determined frequencies $f_1$, $f_2$, $f_3$, $f_4$ based on the comparison. In particular, the determined frequency is identified as a frequency that corresponds to one of the first voltage gains $V_{1g1}$, $V_{1g2}$, $V_{1g3}$, $V_{1g4}$ and a corresponding one of the second voltage gains $V_{2g1}$, $V_{2g2}$, $V_{2g3}$, $V_{2g4}$ having the same or similar voltage gain values. For example, if the voltage gain values of the voltage gain $V_{1g3}$ and the voltage gain $V_{2g3}$ have substantially similar values, the frequency $f_3$ associated with these voltage gains $V_{1g3}$, $V_{2g3}$ is identified as the determined frequency.

Additionally, the controller 156 may select the identified determined frequency as the optimal operating frequency of the wireless power transfer system 100. In particular, since the voltage gains values remain the same or substantially similar even when the load drastically changes from the "no load" state represented by the first load 176 to the "full load"

state represented by the second load 178 or vice-versa, the identified determined frequency is representative of the optimal operating frequency of the wireless power transfer system 100. Further, upon identifying the optimal operating frequency, the controller 156 may communicate a frequency signal representative of the optimal operating frequency to the control unit 106. Also, during the normal operation, the control unit 106 is configured to operate the first converting unit 104 at this optimal operating frequency to facilitate enhanced transmission of the input power from the power source 102 to the device load 152, while reducing or minimizing any stress on the components of the wireless power transfer system 100.

It may be noted that a scenario where the voltage gain value of each of the first voltage gains $V_{1g1}$, $V_{1g2}$, $V_{1g3}$, $V_{1g4}$ does not match with a voltage gain value of the corresponding second voltage gains $V_{2g1}$, $V_{2g2}$, $V_{2g3}$, $V_{2g4}$ may be representative of a fault condition in the wireless power transfer system 100. Typically, if the wireless power transfer system 100 is operating without any fault, at least one voltage gain value of the first voltage gains may match a voltage gain value of the corresponding second voltage gains. However, if the wireless power transfer system 100 has one or more faults, these voltage gain values may not match, which is indicative of an abnormal or faulty condition of the wireless power transfer system 100.

Also, the controller 156 may be configured to inform a user or operator when one or more fault conditions occur in the wireless power transfer system 100. Alternatively or additionally, these fault conditions may be logged for later use by the user. The one or more fault conditions may include misalignment of the coils 128, damaged and/or aged components in the wireless power transfer system 100, and/or an improper device load 152.

In one embodiment, the controller 156 may attempt to determine the optimal operating frequency for a determined number of attempts. If the controller 156 fails to determine the optimal operating frequency within the determined number of attempts, the controller 156 may be configured to inform the user regarding occurrence of one or more fault conditions in the wireless power transfer system 100. Optionally, the controller 156 may shut down the wireless power transfer system 100.

Thus, by employing the exemplary calibration device 154, the wireless power transfer system 100 may be operated at the optimal operating frequency at which a ratio of the second DC voltage across the load 152 and the first DC voltage provided by the power source 102 is approximately constant for various loads. More specifically, variation of the voltage gain is minimal even when the load drastically changes from the "full load" state to the "no load" state. This minimal variation of the voltage gain in the wireless power transfer system 100 may in turn reduce the stress on the components of the wireless power transfer system 100.

Figure 2:
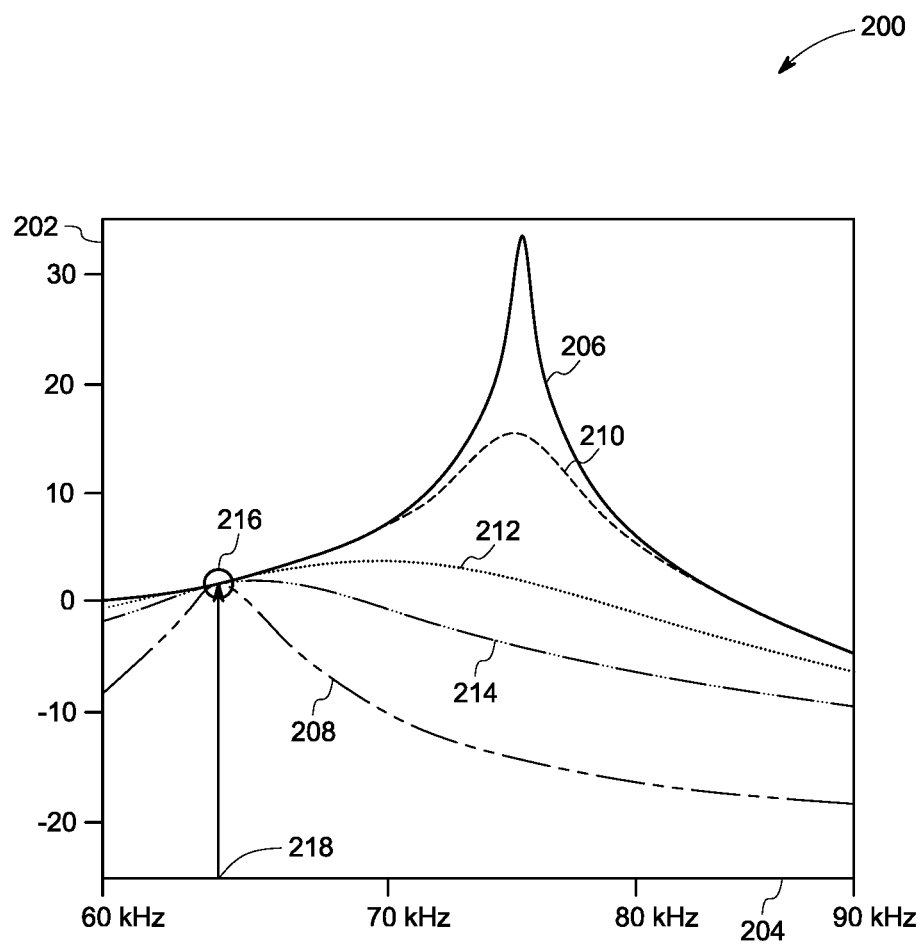
FIG. 2 is a graphical representation of different voltage gain curves, in accordance with aspects of the present specification.

Referring to FIG. 2, a graphical representation 200 of different voltage gain curves, in accordance with aspects of the present specification, is depicted. FIG. 2 is described with reference to the components of FIG. 1.

Reference numeral 202 represents a Y-axis that indicates a magnitude of voltage gains. Also, reference numeral 204 represents an X-axis that indicates values of determined frequencies $f_1$, $f_2$, $f_3$, $f_4$ of the input voltage signals $V_{i1}$, $V_{i2}$, $V_{i3}$, $V_{i4}$. Further, reference numeral 206 is representative of a first voltage gain curve that is associated with a no-load state of the first electrical load 176. Particularly, the first voltage gain curve 206 is obtained by plotting a magnitude of each of the first voltage gains $V_{1g1}$, $V_{1g2}$, $V_{1g3}$, $V_{1g4}$ with respect to a corresponding determined frequency $f_1$, $f_2$, $f_3$, $f_4$. Similarly, reference numeral 208 is representative of a second voltage gain curve that is associated with a full load state of the second electrical load 178. Particularly, the second voltage gain curve 208 is obtained by plotting a magnitude of each of the second voltage gains $V_{2g1}$, $V_{2g2}$, $V_{2g3}$, $V_{2g4}$ with respect to a corresponding determined frequency $f_1$, $f_2$, $f_3$, $f_4$. In a similar fashion, other voltage gain curves 210, 212, 214 may be obtained for a corresponding electrical load in the load unit 160.

Further, reference numeral 216 is representative of a location on the voltage gain curves where a magnitude of one of the first voltage gains $V_{1g1}$, $V_{1g2}$, $V_{1g3}$, $V_{1g4}$ is proximate or equal to a magnitude of one of the second voltage gains $V_{2g1}$, $V_{2g2}$, $V_{2g3}$, $V_{2g4}$. Also, a determined frequency 218 that corresponds to these magnitudes is identified as the optimal operating frequency of the wireless power transfer system 100.

Figure 3:
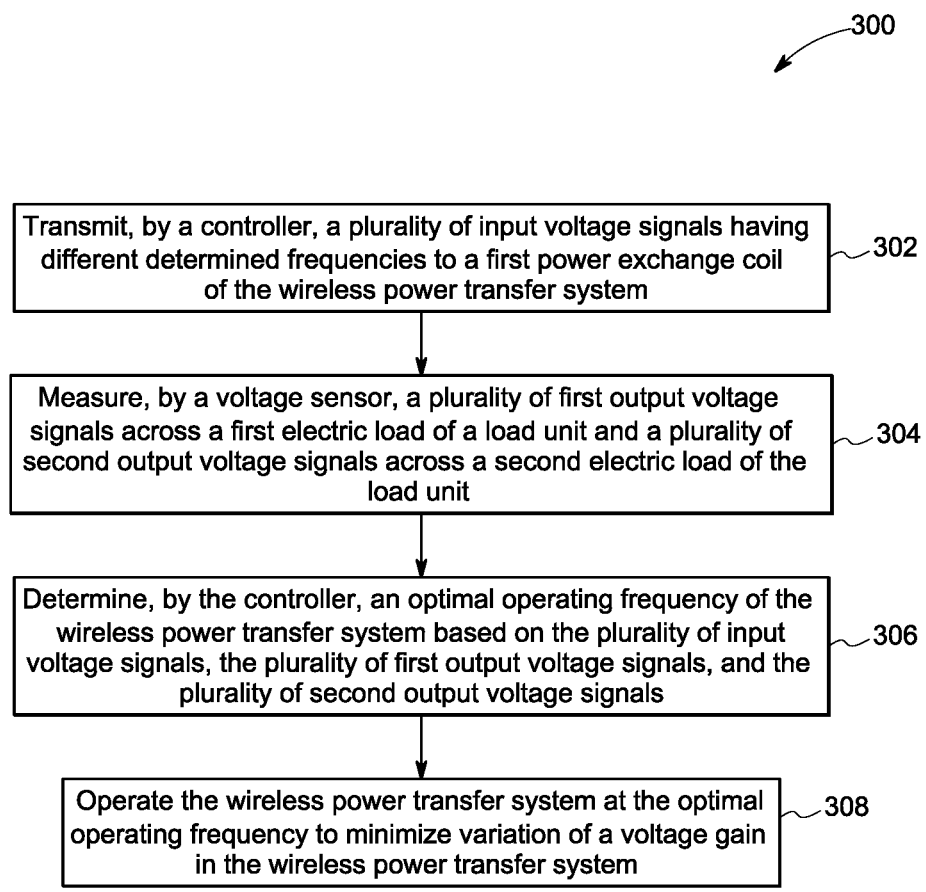
FIG. 3 is a flow chart illustrating a method for determining an optimal operating frequency of the wireless power transfer system of FIG. 1, in accordance with aspects of the present specification.

Referring to FIG. 3, a flow chart illustrating a method for determining an optimal operating frequency of a wireless power transfer system, in accordance with aspects of the present specification, is depicted. For ease of understanding, the method 300 is described with reference to the components of FIG. 1.

As previously noted, the wireless power transfer system 100 includes the first and second converting units 104, 110, the contactless power transfer unit 108, the control unit 106, and the calibration device 154. It may be noted that the method 300 is performed during calibration of the wireless power transfer system 100 by the calibration device 154. More specifically, during the calibration process, the calibration device 154 is operatively coupled to the contactless power transfer unit 108, and the power source 102 and the device load 152 are decoupled from the wireless power transfer system 100.

The method 300 begins at step 302, where a plurality of input voltage signals having different determined frequencies is transmitted to the first power exchange coil 130 of the wireless power transfer system 100. To that end, the controller 156 in the calibration device 154 is configured to generate and communicate these input voltage signals $V_{i1}$, $V_{i2}$, $V_{i3}$, $V_{i4}$ having different determined frequencies $f_1$, $f_2$, $f_3$, $f_4$ to the first power exchange coil 130.

Subsequently, at step 304, a plurality of first output voltage signals $V_{1o1}$, $V_{1o2}$, $V_{1o3}$, $V_{1o4}$ across the first electrical load 176 of the load unit 160 in the calibration device 154 and a plurality of second output voltage signals $V_{2o1}$, $V_{2o2}$, $V_{2o3}$, $V_{2o4}$ across the second electrical load 178 of the load unit 160 are measured via use of the voltage sensor 162. These first and second output voltage signals $V_{1o1}$, $V_{1o2}$, $V_{1o3}$, $V_{1o4}$ and $V_{2o1}$, $V_{2o2}$, $V_{2o3}$, $V_{2o4}$ are generated in response to the input voltage signals $V_{i1}$, $V_{i2}$, $V_{i3}$, $V_{i4}$ being conveyed from the control unit 106 to the first electrical load 176 and the second electrical load 178. Moreover, the voltage sensor 162 that is coupled to the first electrical load 176 and the second electrical load 178 is also configured to communicate the first output voltage signals $V_{1o1}$, $V_{1o2}$, $V_{1o3}$, $V_{1o4}$ and the second output voltage signals $V_{2o1}$, $V_{2o2}$, $V_{2o3}$, $V_{2o4}$ to the controller 156.

Furthermore, at step 306, an optimal operating frequency of the wireless power transfer system 100 is determined based on the plurality of input voltage signals, the plurality of first output voltage signals, and the plurality of second output voltage signals. In one embodiment, the controller 156 is used to determine the optimal operating frequency. More particularly, the controller 156 is configured to compute the first voltage gains $V_{1g1}$, $V_{1g2}$, $V_{1g3}$, $V_{1g4}$ based on the first output voltage signals $V_{1o1}$, $V_{1o2}$, $V_{1o3}$, $V_{1o4}$ and the input voltage signals $V_{i1}$, $V_{i2}$, $V_{i3}$, $V_{i4}$. Similarly, the controller 156 is configured to compute the second voltage gains $V_{2g1}$, $V_{2g2}$, $V_{2g3}$, $V_{2g4}$ based on the second output voltage signals $V_{2o1}$, $V_{2o2}$, $V_{2o3}$, $V_{2o4}$ and the input voltage signals $V_{i1}$, $V_{i2}$, $V_{i3}$, $V_{i4}$. Further, the controller 156 is configured to compare the first voltage gains $V_{1g1}$, $V_{1g2}$, $V_{1g3}$, $V_{1g4}$ with corresponding second voltage gains $V_{2g1}$, $V_{2g2}$, $V_{2g3}$, $V_{2g4}$ to identify a determined frequency from the different determined frequencies $f_1$, $f_2$, $f_3$, $f_4$. In particular, the determined frequency may be identified as the frequency that corresponds to one of the first voltage gains $V_{1g1}$, $V_{1g2}$, $V_{1g3}$, $V_{1g4}$ and one of the second voltage gains $V_{2g1}$, $V_{2g2}$, $V_{2g3}$, $V_{2g4}$ that have similar voltage gain values. In addition, the controller 156 may select the identified determined frequency as the optimal operating frequency of the wireless power transfer system 100.

In addition, at step 308, the wireless power transfer system 100 is operated at the optimal operating frequency. Particularly, the first converting unit 104 in the wireless power transfer system 100 is operated at this optimal operating frequency to facilitate enhanced transmission of the input power from the power source 102 to the device load 152, while reducing or minimizing any stress on the components of the wireless power transfer system 100. In addition, operating the wireless power transfer system 100 at the optimal operating frequency aids in minimizing any variations of the voltage gain(s) in the wireless power transfer system 100.

Figure 4:
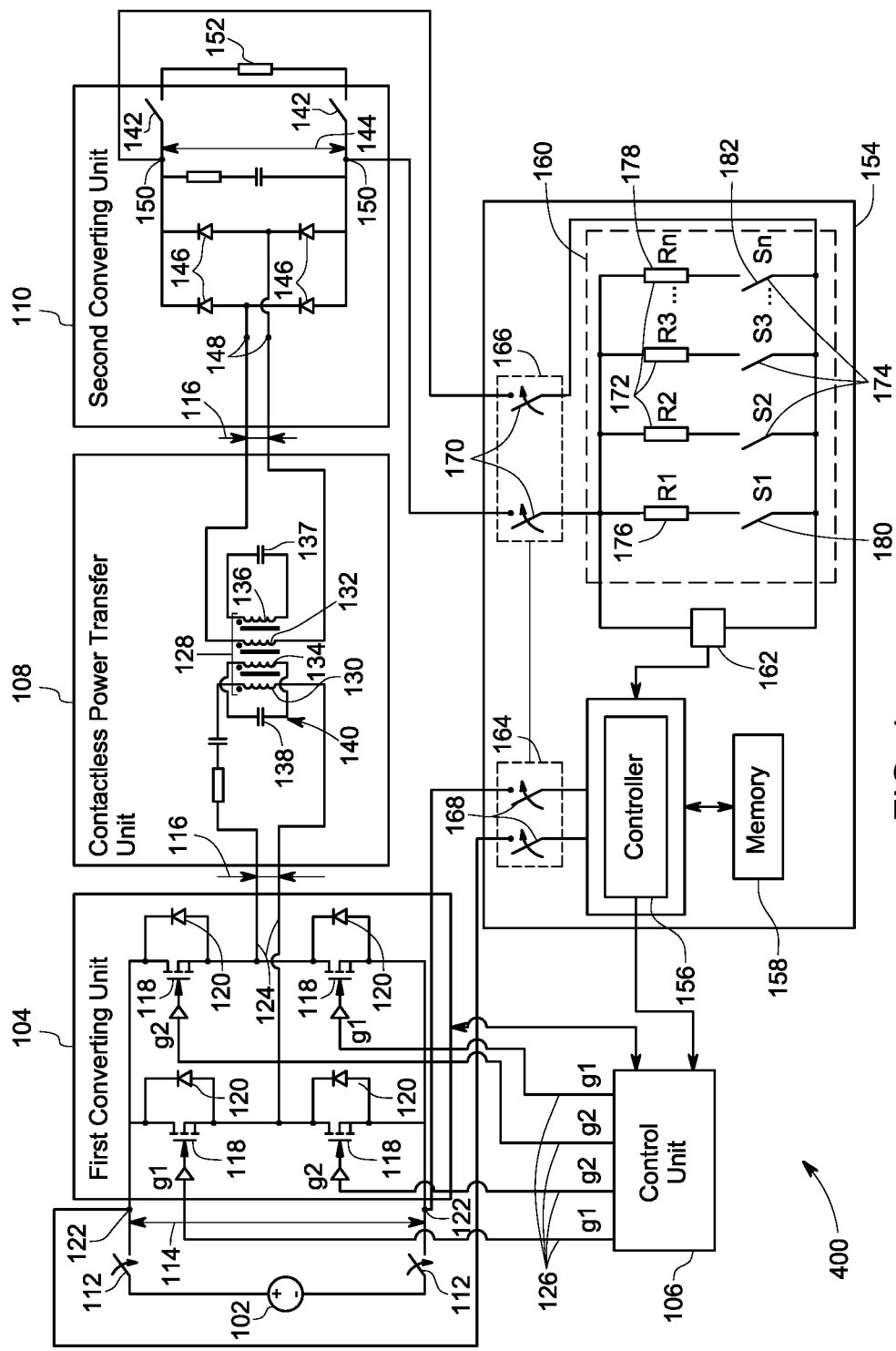
FIG. 4 is a diagrammatical representation of another embodiment of a wireless power transfer system, in accordance with aspects of the present specification.

Turning now to FIG. 4, a diagrammatical representation of another embodiment of a wireless power transfer system 400, in accordance with aspects of the present specification, is depicted. The wireless power transfer system 400 is similar to the wireless power transfer system 100 of FIG. 1 except that the calibration device 154 is coupled to the input terminals 122 of the first converting unit 104 and to the output terminals 150 of the second converting unit 110. In particular, the first switching sub-unit 164 of the calibration device 154 is configured to operatively couple the controller 156 to the first power exchange coil 130 via the first converting unit 104 of the wireless power transfer system 400. Also, the second switching sub-unit 166 of the calibration device 154 is configured to operatively couple the load unit 160 to the second power exchange coil 132 via the second converting unit 110 of the wireless power transfer system 400.

As depicted in FIG. 4, the first switching sub-unit 164 is coupled to the input terminals 122 of the first converting unit 104, while the second switching sub-unit 166 is coupled to the output terminals 150 of the second converting unit 110. Also, in this embodiment, the second power switches 142 are positioned between the second converting unit 110 and the load 152 to couple the load 152 to the second converting unit 110 or decouple the load 152 from the second converting unit 110.

Moreover, as the first switching sub-unit 164 is coupled to the input terminals 122 of the first converting unit 104, the controller 156 may generate and communicate a plurality of first DC voltage signals to the first converting unit 104, which in turn converts these first DC voltage signals to a plurality of input voltage signals $V_{i1}$, $V_{i2}$, $V_{i3}$, $V_{i4}$. Further, these input voltage signals $V_{i1}$, $V_{i2}$, $V_{i3}$, $V_{i4}$ are transmitted to the first power exchange coil 130.

In a similar manner, as the second switching sub-unit 166 is coupled to the output terminals 150 of the second converting unit 110, the load unit 160 may receive a plurality of second DC voltage signals from the second converting unit 110. In particular, the second power exchange coil 132 may receive the input voltage signals $V_{i1}$, $V_{i2}$, $V_{i3}$, $V_{i4}$ from the first power exchange coil 130. Also, the input voltage signals $V_{i1}$, $V_{i2}$, $V_{i3}$, $V_{i4}$ are transmitted from the second power exchange coil 130 to the second converting unit 110. The second converting unit 110 in turn converts these input voltage signals $V_{i1}$, $V_{i2}$, $V_{i3}$, $V_{i4}$ to the plurality of second DC voltage signals. Further, the plurality of second DC voltage signals is transmitted from the second converting unit 110 to the load unit 160. Moreover, in this embodiment, the voltage gain is computed based on a ratio of the output voltage across a load, e.g., the load 176 and a peak or a root mean square (RMS) value of one of the input voltage signals $V_{i1}$, $V_{i2}$, $V_{i3}$, $V_{i4}$.

Furthermore, it may be noted that the presence of components in the first and second converting units 104, 110 may introduce a non-linearity in the electrical current flowing through the system 400 and/or the voltage in the system 400, which in turn may affect the voltage gain of the system 400. However, in this embodiment, during calibration of the system 400, the components of the first and second converting units 104, 110 are also used along with other components to transmit the input voltage signals and receive the output voltage signals. Hence, the variation of the voltage gain of the system 400 is minimal even if the components in the first and second converting units 104, 110 introduce any non-linearity in the current and/or voltage in the system 400.

The various embodiments of the exemplary system and method described hereinabove aid in determining an optimal operating frequency of a wireless power transfer system. By operating the wireless power transfer system at this optimal operating frequency, an output voltage of the wireless power transfer system may be controlled or maintained below a threshold or allowable value even if a device load coupled to the wireless power transfer system or an impedance in the wireless power transfer system changes substantially. Also, variation of the voltage gain of the wireless power transfer system may be substantially reduced or minimized. Consequently, stress on the components in the wireless power transfer system is reduced, thereby preventing the components from damage.

While only certain features of the present disclosure have been illustrated and described herein, many modifications and changes will occur to those skilled in the art. It is, therefore, to be understood that the appended claims are intended to cover all such modifications and changes as fall within the true spirit of the present specification.

The invention claimed is:

1. A calibration device for a wireless power transfer system that includes a first power exchange coil and a second power exchange coil, the calibration device comprising:
   a load unit operatively coupled to the second power exchange coil, wherein the load unit is configured to replicate different load states that include at least a first load state associated with a first electrical load and a second load state associated with a second electrical load; and
   a voltage sensor coupled to the load unit, wherein the voltage sensor is configured to:
      measure a plurality of first output voltage signals across the load unit while the load unit is configured to replicate the first load state, the plurality of first output voltage signals measured for a plurality of input voltage signals having different frequencies,
      measure a plurality of second output voltage signals across the load unit while the load unit is configured to replicate the second load state, the plurality of second output voltage signals measured for the plurality of input voltage signals having different frequencies, and communicate the plurality of first output voltage signals and the plurality of second output voltage signals to a controller that is configured to determine an operating frequency of the wireless power transfer system, wherein the determined operating frequency is a frequency of one of the plurality of input voltage signals that minimizes variation of a voltage gain among the plurality of first output voltage signals and the plurality of second output voltage signals.

2. The calibration device of claim 1, further comprising:
the controller configured to:
compute a plurality of first voltage gains based on the plurality of input voltage signals and corresponding first output voltage signals measured while the load unit is configured to replicate the first load state, wherein each of the plurality of first voltage gains corresponds to one of the different frequencies of the plurality of input voltage signals;
compute a plurality of second voltage gains based on the plurality of input voltage signals and corresponding second output voltage signals measured while the load unit is configured to replicate the second load state, wherein each of the plurality of second voltage gains corresponds to one of the different frequencies of the plurality of input voltage signals;
identify a first frequency from the different frequencies that corresponds to one of the plurality of first voltage gains and one of the plurality of second voltage gains having similar voltage gain values; and
select the first frequency as the determined operating frequency of the wireless power transfer system.

3. The calibration device of claim 1, further comprising:
a first switching sub-unit configured to operatively couple the controller to the first power exchange coil of the wireless power transfer system; and
a second switching sub-unit configured to operatively couple the load unit to the second power exchange coil of the wireless power transfer system.

4. The calibration device of claim 1, wherein the load unit further comprises:
a first switch configured to operatively couple the first electrical load to the second power exchange coil; and
a second switch configured to operatively couple the second electrical load to the second power exchange coil.

5. The calibration device of claim 1, wherein the controller is further configured to cause the wireless power transfer system to operate at the determined operating frequency to minimize variation of the voltage gain in the wireless power transfer system independent of variations of a device load coupled to the wireless power transfer system.

6. The calibration device of claim 1, wherein the determined operating frequency is a frequency that produces a substantially equivalent gain in the different load states.

7. The calibration device of claim 1, wherein the load unit is coupled to the second power exchange coil during a calibration operation performed prior to a normal operation of the wireless power transfer system and wherein the load unit is decoupled from the second power exchange coil during the normal operation of the wireless power transfer system.

8. A method for determining an operating frequency of a wireless power transfer system, comprising:

replicating, by a load unit of a calibration device, different load states that include at least a first load state associated with a first electrical load and a second load state associated with a second electrical load, wherein the load unit is coupled to a second power exchange coil that receives wireless power from a first power exchange coil of the wireless power transfer system;

receiving, by the second power exchange coil, a plurality of input voltage signals having different frequencies from the first power exchange coil of the wireless power transfer system;

measuring, by a voltage sensor of the calibration device, a plurality of first output voltage signals across the load unit while the load unit is configured to replicate the first load state, the plurality of first output voltage signals measured for the plurality of input voltage signals having different frequencies;

measuring, by the voltage sensor, a plurality of second output voltage signals across the load unit while the load unit is configured to replicate the second load state, the plurality of second output voltage signals measured for the plurality of input voltage signals having different frequencies; and communicating the plurality of first output voltage signals and the plurality of second output voltage signals to a controller that is configured to determine the operating frequency of the wireless power transfer system, wherein the determined operating frequency is a frequency of one of the plurality of input voltage signals that minimizes variation of a voltage gain among the plurality of first output voltage signals and the plurality of second output voltage signals.

9. The method of claim 8, further comprising:
computing, by the controller, a plurality of first voltage gains based on the input voltage signals and the corresponding first output voltage signals measured while the load unit is configured to replicate the first load state, wherein each of the plurality of first voltage gains corresponds to one of the different frequencies of the input voltage signals; and
computing, by the controller, a plurality of second voltage gains based on the input voltage signals and the corresponding second output voltage signals measured while the load unit is configured to replicate the second load state, wherein each of the plurality of second voltage gains corresponds to one of the different frequencies of the input voltage signals.

10. The method of claim 9, further comprising:
identifying, by the controller, a first frequency from the different frequencies that corresponds to one of the plurality of first voltage gains and one of the plurality of second voltage gains having similar voltage gain values; and
selecting, by the controller, the first frequency as the operating frequency of the wireless power transfer system.

11. The method of claim 8, further comprising:
coupling, by a first switching sub-unit, the controller to the first power exchange coil of the wireless power transfer system; and
coupling, by a second switching sub-unit, one of the first electrical load and the second electrical load to the second power exchange coil of the wireless power transfer system.

12. The method of claim 11, wherein coupling, by the first switching sub-unit, the controller to the first power exchange coil comprises operatively coupling the controller to the first power exchange coil if a power source is decoupled from the wireless power transfer system.

13. The method of claim 11, wherein coupling, by the second switching sub-unit, the first electrical load and the second electrical load to the second power exchange coil comprises operatively coupling the first electrical load and the second electrical load to the second power exchange coil if the second converting unit is decoupled from the second power exchange coil.

14. The method of claim 8, wherein the determined operating frequency is a frequency that produces a substantially equivalent gain in the different load states.

15. The method of claim 8, wherein the load unit is coupled to the second power exchange coil during a calibration operation performed prior to a normal operation of the wireless power transfer system and wherein the load unit is decoupled from the second power exchange coil during the normal operation of the wireless power transfer system.

16. A wireless power transfer system, comprising:
a contactless power transfer unit comprising at least a first power exchange coil configured to transfer wireless energy to a second power exchange coil; and
a controller operatively coupled to the first power exchange coil of the contactless power transfer unit, wherein the controller is configured to:
cause the first power exchange coil to produce a plurality of input voltage signals having different frequencies while a load unit operatively coupled to the second power exchange coil replicates different load states that include at least a first load state associated with a first electrical load and a second load state associated with a second electrical load,
receive, from a voltage sensor coupled to the load unit, a plurality of first output voltage signals and a plurality of second output voltage signals, the plurality of first output voltage signals measured across the load unit while the load unit is configured to replicate the first load state for the plurality of input voltage signals having the different frequencies, the plurality of second output voltage signals measured across the load unit while the load unit is configured to replicate the second load state for the plurality of input voltage signals having the different frequencies, and
determine an operating frequency of the wireless power transfer system, wherein the determined operating frequency is a frequency of one of the plurality of input voltage signals that minimizes variation of a voltage gain among the plurality of first output voltage signals and the plurality of second output voltage signals.

17. The wireless power transfer system of claim 16, further comprising:
a control unit configured to operate the wireless power transfer system at the determined operating frequency determined by the controller.

18. The wireless power transfer system of claim 16, wherein the controller is configured to:
compute a plurality of first voltage gains based on the plurality of input voltage signals and corresponding first output voltage signals measured while the load unit is configured to replicate the first load state, wherein each of the plurality of first voltage gains corresponds to one of the different frequencies of the plurality of input voltage signals;
compute a plurality of second voltage gains based on the plurality of input voltage signals and corresponding second output voltage signals measured while the load unit is configured to replicate the second load state, wherein each of the plurality of second voltage gains corresponds to one of the different frequencies of the plurality of input voltage signals;
identify a first frequency from the different frequencies that corresponds to one of the plurality of first voltage gains and one of the plurality of second voltage gains having similar voltage gain values; and
select the first frequency as the determined operating frequency of the wireless power transfer system.

19. The wireless power transfer system of claim 16, wherein the determined operating frequency is a frequency that produces a substantially equivalent gain in the different load states.

20. The wireless power transfer system of claim 16, wherein the controller is configured to determine the operating frequency during a during a calibration operation performed prior to a normal operation of the wireless power transfer system.

* * * * *